United States Patent Office 3,129,234
Patented Apr. 14, 1964

3,129,234
NEW HYDROXY-OESTRANE COMPOUNDS
Kyosuke Tsuda, Saitama-ken, Shigeo Nozoe, Kanagawa-ken, and Yutaka Okada, Tokyo, Japan, assignors to Sankyo Company, Limited, Chuo-ku, Tokyo, Japan
No Drawing. Filed July 5, 1962, Ser. No. 207,799
10 Claims. (Cl. 260—397.45)

The invention relates to the preparation of new hydroxylated oestrane compounds.

The invention relates particularly to the preparation of new compounds of the general formula

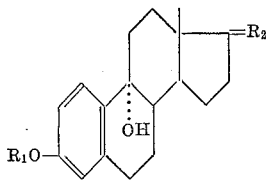

in which $R_1$=an alkyl group or an acyl group, and
$R_2$=H ($\beta$OAcyl) or a keto group.

The compounds according to the invention are particularly valuable on account of their hypocholesteremic activity attended with a weak oestrogenic activity. Furthermore the present new compounds possess an ovulation, gonad inhibiting and anti-aldosterone activity.

In the process according to the invention as starting material there is taken $\Delta^{9(11)}$-oestrone or $\Delta^{9(11)}$-oestradiol, of which in both cases the 3-hydroxyl group is esterified or etherified. Starting with $\Delta^{9(11)}$-oestradiol the 17-hydroxyl group is esterified.

The ester radical may have been derived from an aliphatic carboxylic acid, or from an inorganic acid. Preferably the acylate derived from a carboxylic acid having 1–30 carbon atoms is used. As examples of such acids are mentioned: acetic acid, propionic acid, butyric acid, valeric acid, trimethyl acetic acid, caproic acid, caprylc acid, capric acid, undecylic acid, lauric acid, tridecylic acid, myristic acid, pentadecylic acid, oleic acid, palmitic acid, stearic acid, arachidic, behenic acid, lignoceric acid, cerotic acid, hexahydrobenzoic acid, benzoic acid, cyclopentylpropionic acid, cyclohexylpropionic acid, cyclohexyl butyric acid, citronelic acid, undecylenic acid, phenyl acetic acid, phenylpropionic acid, phenylbutyric acid, succinic acid, glutamic acid, tartaric acid, and inorganic acids, such as sulphuric acid and phosphoric acid.

The ether radical in 3-position possibly present is preferably a lower alkyl group, such as a methyl, ethyl, propyl, isopropyl, butyl, pentyl or hexyl group.

These starting products have been previously described in U.S. Patents 2,874,173 and 2,885,413.

The starting products are primarily converted into the corresponding 9α-hydroxy-11β-halo-compounds by means of a halogenating agent. In this reaction use may be made of the hypohalogenous acids hypobromous acid and hypochlorous acid or a compound capable of supplying one of these acids during the reaction, such as N-halo-acylamides e.g. N-bromo-acetamide, N-chloro-acetamide, N-bromo-propionic acid amide, N-halo-acylimides e.g. N-bromo-succinimide or N-chloro-succinimide, and other compounds, such as dibromo-dimethylhydantoin.

The surprising element of the present process is that these ring A aromatic $\Delta^{9(11)}$-steroids are hydroxylated in 9-position and halogenated in 11-position unlike $\Delta^{9(11)}$-steroids possessing no aromatic ring A, which are hydroxylated in 11-position and halogenated in 9-position.

The halogenating reaction described before is preferably performed in a water-miscible inert solvent, such as an alcohol, a ketone, such as acetone, an ether, such as dimethylether, dioxane or tetrahydrofuran, or an aliphatic carboxylic acid.

The reaction period and the temperature may vary widely, but commonly the reaction is performed in 5 minutes to 2 hours at a temperature ranging from —15 to +25° C., preferably between 0 and 10° C.

The reaction is preferably conducted in the presence of an acid, such as perchloric acid.

After completion of the reaction the thus obtained 9α-hydroxy-11β-halo-steroid may be isolated from the reaction mixture by one of the conventional methods. For example, a large amount of water is poured into the reaction mixture after treatment with sodium bisulfite and the substance thus formed is recovered by filtration.

The thus obtained 9α-hydroxy-11β-halo-compound is next treated, by any method known per se, with a dehalogenating agent to prepare the corresponding in 11-position unsubstituted compound.

This dehalogenating reaction can be performed for instance by reacting the 11-halo-compound with Raney nickel, possibly in the presence of a lower aliphatic carboxylic acid, or a ketone such as acetone or cyclohexanone. The dehalogenating reaction can also be performed by hydration in the presence of certain catalysts, such as palladium.

The dehalogenation is preferably carried out with Raney nickel in the presence of an organic solvent e.g. an ether such as dimethylether, diethylether, dioxane, tetrahydrofuran or a mixture of dioxane and diethylether.

The reaction is commonly performed in the dark at a temperature of about —10° to 25° C. for about 3 to 24 hours.

After completion of the reaction the desired product thus formed may be isolated from the reaction mixture by one of the conventional methods, for example, the Raney nickel is filtered off and the filtrate is distilled under reduced pressure to give the desired product.

The following examples are given for purpose of illustration and not by way of limitation.

Example 1

To a solution of 1.55 g. of 3-acetoxy-estra-1,3,5(10), 9(11)-tetraen-17-one in 40 ml. of acetone is added 1.29 g. of n-bromo-succinimide at —5° C. 8.1 ml. of 0.2 N perchloric acid solution is added dropwise to the reaction mixture with stirring over about 20 minutes while maintaining the mixture to temperature of —5° to 0° C., and the stirring is continued for additional 30 minutes. Aqueous sodium bisulfite solution is added to the resulting mixture until the colour of the solution disappears and the reaction mixture is poured into a large amount of cold water. The crystalline substance thus crystallized is filtered, washed with water and dried. Recrystallisation of the crystalline substance (1.82 g.) thus obtained from diethyl ether gives 3-acetoxy-9α-hydroxy-11β-bromo-estra-1,3,5(10)-triene-17-one as colorless prisms melting at 112–113° C. with decomposition. The Beilstein reaction of the product is positive.

*Analysis.*—Calculated for $C_{20}H_{23}O_4Br$: C, 58.98 percent; H, 5.69 percent. Found: C, 59.23 percent; H, 5.67 percent.

Example 2

To a solution of 600 mg. of 3-acetoxy-9α-hydroxy-11β-bromo-estra-1,3,5(10)-trien-17-one in a mixture of 25 ml. of diethyl ether and 20 ml. of dioxane is added 10 ml. of activated Raney nickel and the mixture is stirred in a dark place at temperature of about 0° C. for 12 hours. After completion of the reaction, the Raney nickel is filtered off and the filtrate is distilled under reduced pressure. The resulting residue is crystallised by the addition of diethyl ether to obtain 350 mg. of 3-acetoxy-9α-hydroxy-estra-1,3,5(10)-trien-17-one as prisms. The product is recrystallized from acetone-n-hexane mixture. Melting point 158°–164° C.

*Analysis.*—Calculated for $C_{20}H_{24}O_4$—½$H_2O$: C, 71.19 percent; H, 7.47 percent. Found: C, 71.44 percent; H, 7.56 percent.

In analogous manner, the 3-caprate, the 3-β-phenylpropionate and the 3-stearate of $\Delta^{1,3,5(10),9(11)}$-3-hydroxy-17-keto-oestratetraene have been converted into the corresponding 9,11-dihydro-9α-hydroxy-compounds.

*Example 3*

To a solution of 3.8 g. of the 3-methylether of $\Delta^{1,3,5(10),9(11)}$-3-hydroxy-17-keto-oestratetraene in 250 ml. dioxane is added 10 ml. of water. The solution is cooled to 0° C. after which 1.45 g. N-bromo acetamide and 10 ml. of 1 N aqueous perchloric acid are added. The mixture is stirred at 0° C. for one hour after which a dilute sodium sulfite solution is added until the yellow solution has been decolorized.

The mixture has been treated further as described in Example 1 to obtain the 3-methylether of $\Delta^{1,3,5(10)}$-3,9α-dihydroxy-11β-bromo-17-keto-oestratriene.

According to the method described in Example 2 there has been obtained the 3-methylether of $\Delta^{1,3,5(10)}$-3,9α-dihydroxy-17-keto-oestratriene.

In an analogous manner there have been prepared the 3-ethylether and the 3-isopropylether of $\Delta^{1,3,5(10)}$-3,9α-dihydroxy-17-keto-oestratriene and the 3-methylether and the 3-ethylether of $\Delta^{1,3,5(10)}$-3,9α-dihydroxy-17β-acetoxy-oestratriene, of $\Delta^{1,3,5(10)}$-3,9-dihydroxy-17β-phenylpropionoxy-oestratriene and of $\Delta^{1,3,5(10)}$-3,9α-dihydroxy-17β-caproxy-oestratriene.

*Example 4*

To a solution of 0.8 g. of $\Delta^{1,3,5(10),9(11)}$-3,17β-diacetoxy-oestratriene in 35 ml. of dioxane 0.68 g. of N-bromo-succinimide and 6 ml. of 0.2 N sulphuric acid are added with stirring and at a temperature of 0° C. The stirring is continued for 75 minutes after which an aqueous sodium bisulfite solution is added until the solution is decolorized. The mixture is treated further as described in Example 1 to obtain $\Delta^{1,3,5(10)}$-3,9α,17β-trihydroxy-11β-bromo-oestratriene-3,17-diacetate.

According to the method described in Example 2 this compound has been converted into the corresponding 9α-hydroxy-compound unsubstituted in 11-position.

In the same manner $\Delta^{1,3,5(10),9(11)}$-3,17-dihydroxy-oestratetraene - 3,17 - caproate, $\Delta^{1,3,(10),9(11)}$ - 3,17 - dihydroxy - oestratetraene - 3 - acetate - 17 - laurate, $\Delta^{1,3,5(10),9(11)}$ - 3,17 - dihydroxy - oestratetraene - 3,17 - caprate and $\Delta^{1,3,5(10),9(11)}$ - 3,17 - dihydroxy - oestratetraene - 3-phenylpropionate-17-stearate have been converted into the corresponding 9,11-dihydro-9α-hydroxy-compounds.

We claim:

1. Process for the preparation of new hydroxy-oestrane compounds of the formula:

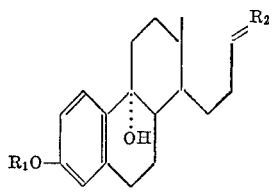

in which
  $R_1$ is selected from the group consisting of a lower alkyl group and an acyl radical, and
  $R_2$ is selected from the group consisting of an (H) acyloxy group and a keto group, and acyl is derived from a member of the group consisting of sulfuric acid, phosphoric acid, and aliphatic, aromatic, and araliphatic carboxylic acids containing from 1 to 30 carbon atoms, comprising reacting a compound of the formula:

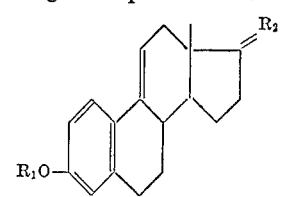

in which $R_1$ and $R_2$ have the meanings as defined above, with a compound selected from the group consisting of hypobromous acid, hypochlorous acid and a compound capable of supplying one of these acids selected from the group consisting of a N-bromo-lower aliphatic acylamine, a N-chloro-lower aliphatic acylamide, a N-bromo-lower aliphatic acylimide, and N-chloro-lower aliphatic acylimide to obtain the corresponding 9α-hydroxy-11β-halo-compound after which the 11β-halo-substituent is split off by reaction with a dehalogenating agent selected from the group consisting of Raney nickel and palladium/hydrogen.

2. Compounds of the formula:

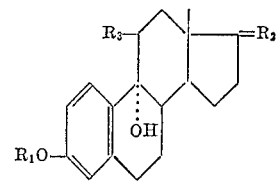

in which
  $R_1$ is selected from the group consisting of a lower alkyl group and an acyl radical,
  $R_2$ is selected from the group consisting of an (H) acyloxy group and a keto group, and acyl is derived from a member of the group consisting of sulfuric acid, phosphoric acid, and aliphatic, aromatic, and araliphatic carboxylic acids containing from 1 to 30 carbon atoms, and
  $R_3$ is selected from the group consisting of bromine and chlorine.

3. Compounds of the formula:

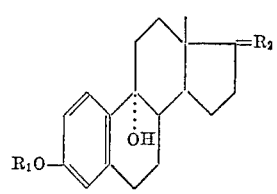

in which
  $R_1$ is selected from the group consisting of a lower alkyl group and an acyl radical and
  $R_2$ is selected from the group consisting of an (H) acyloxy group and a keto group and acyl is derived from a member of the group consisting of sulfuric acid, phosphoric acid, and aliphatic, aromatic and araliphatic carboxylic acids containing from 1 to 30 carbon atoms.

4. Compounds of the formula:

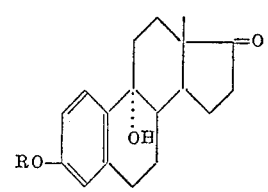

in which R is selected from the group consisting of a lower alkyl group, and an acyl radical.

5. $\Delta^{1,3,5,(10)}$ - 3,9α - dihydroxy - 17 - keto - oestratriene-3-acylate, wherein acyl is derived from a member of the group consisting of sulfuric acid, phosphoric acid, and aliphatic, aromatic and araliphatic carboxylic acids containing from 1 to 30 carbon atoms.

6. $\Delta^{1,3,5(10)}$ - 3,9α - dihydroxy - 17 - keto - oestratriene-3-acylate the 3-acylate group of which is derived from an aliphatic carboxylic acid having 1–30 carbon atoms.

7. 9α-hydroxy-oestrone-3β-phenylpropionate.

8. 9α-hydroxy-oestrone-3-caprate.

9. 9α-hydroxy-oestrone-3-laurate.

10. 9α-hydroxy-oestrone-3-stearate.

References Cited in the file of this patent

UNITED STATES PATENTS 3,055,885   Nomine et al. _____ Sept. 25, 1962